US008591623B2

(12) United States Patent
Beall et al.

(10) Patent No.: US 8,591,623 B2
(45) Date of Patent: Nov. 26, 2013

(54) HONEYCOMB MANUFACTURING METHOD USING GROUND NUT SHELLS AND HONEYCOMB BODY PRODUCED THEREBY

(75) Inventors: Douglas Munroe Beall, Painted Post, NY (US); David John Thompson, Savona, NY (US)

(73) Assignee: Corning Incorporated, Corning, NY (US)

( * ) Notice: Subject to any disclaimer, the term of this patent is extended or adjusted under 35 U.S.C. 154(b) by 132 days.

(21) Appl. No.: 12/920,002

(22) PCT Filed: Feb. 27, 2009

(86) PCT No.: PCT/US2009/001277
§ 371 (c)(1),
(2), (4) Date: Mar. 31, 2011

(87) PCT Pub. No.: WO2009/108362
PCT Pub. Date: Sep. 3, 2009

(65) Prior Publication Data
US 2012/0031061 A1 Feb. 9, 2012

Related U.S. Application Data

(60) Provisional application No. 61/067,614, filed on Feb. 29, 2008.

(51) Int. Cl.
*B01D 39/14* (2006.01)
*B01D 39/06* (2006.01)
*B01D 24/00* (2006.01)
*B01D 50/00* (2006.01)

(52) U.S. Cl.
USPC ............... 55/523; 55/522; 55/524; 422/169; 422/170; 422/171; 422/172; 422/177; 422/178; 422/179; 422/180; 422/181; 422/182

(58) Field of Classification Search
USPC ............ 55/522–524; 422/169–172, 177–182
See application file for complete search history.

(56) References Cited

U.S. PATENT DOCUMENTS

| 4,329,162 A | 5/1982 | Pitcher, Jr. ...................... 55/523 |
| 4,390,355 A | 6/1983 | Hammond, Jr. et al. ......... 55/523 |
| 4,416,676 A | 11/1983 | Montierth ....................... 55/523 |
| 4,509,966 A | 4/1985 | Dimick et al. .................. 55/502 |

(Continued)

FOREIGN PATENT DOCUMENTS

| WO | 03/074599 | 9/2003 |
| WO | 2008/005249 | 1/2008 |
| WO | 2008/008332 | 1/2008 |

OTHER PUBLICATIONS

Richard A. Jaynes, http://www.angelfire.com/tn2/minsrecipes/IndigenousPlants/Walnut.htm, May 14, 2005.*

*Primary Examiner* — Amber Orlando
(74) *Attorney, Agent, or Firm* — Matthew B. McNutt

(57) ABSTRACT

A method of manufacturing a honeycomb body is disclosed having the steps of mixing inorganic source materials, a nut shell pore former, and forming aids to form a plasticized batch, wherein the nut shell pore former has a particle size distribution with 20 µm≤$d_{p50}$≤70 µm, and forming the plasticized batch into the honeycomb body having a plurality of channels formed by intersecting walls. Green honeycombs and porous ceramic honeycombs produced by the method are also disclosed.

16 Claims, 2 Drawing Sheets

(56) References Cited

U.S. PATENT DOCUMENTS

| | | | |
|---|---|---|---|
| 4,557,773 A | 12/1985 | Bonzo | 156/64 |
| 4,840,827 A | 6/1989 | Mizutani et al. | 428/116 |
| 4,973,566 A | 11/1990 | Readey et al. | 501/129 |
| 5,082,480 A | 1/1992 | Dorazio | 55/523 |
| 5,205,991 A | 4/1993 | Avery et al. | 422/129 |
| 5,750,026 A * | 5/1998 | Gadkaree et al. | 210/502.1 |
| 6,080,348 A | 6/2000 | Shalkey | 264/177.12 |
| 6,322,605 B1 * | 11/2001 | He et al. | 55/523 |
| 6,770,111 B2 * | 8/2004 | Morena et al. | 55/523 |
| 6,809,139 B2 | 10/2004 | Fabian et al. | 524/430 |
| 6,818,580 B2 | 11/2004 | Kumazawa et al. | 501/119 |
| 6,827,754 B2 * | 12/2004 | Suwabe et al. | 55/523 |
| 7,011,803 B2 * | 3/2006 | Ichikawa et al. | 423/345 |
| 7,141,089 B2 * | 11/2006 | Beall et al. | 55/523 |
| 7,744,670 B2 | 6/2010 | Miao et al. | 55/523 |
| 7,901,480 B2 * | 3/2011 | Zuberi et al. | 55/523 |
| 2002/0132720 A1 * | 9/2002 | Cutler et al. | 501/103 |
| 2003/0041574 A1 * | 3/2003 | Noguchi et al. | 55/523 |
| 2004/0029707 A1 * | 2/2004 | Beall et al. | 501/119 |
| 2004/0148916 A1 * | 8/2004 | Merkel | 55/523 |
| 2004/0152593 A1 * | 8/2004 | Cutler et al. | 502/439 |
| 2004/0244344 A1 * | 12/2004 | Ichikawa | 55/523 |
| 2004/0261384 A1 | 12/2004 | Merkel et al. | 55/523 |
| 2005/0069469 A1 * | 3/2005 | Fu et al. | 422/177 |
| 2006/0021308 A1 | 2/2006 | Merkel | 55/523 |
| 2006/0272306 A1 | 12/2006 | Kirk et al. | 55/523 |
| 2007/0107395 A1 * | 5/2007 | Zuberi et al. | 55/523 |
| 2007/0119135 A1 * | 5/2007 | Miao et al. | 55/523 |
| 2007/0214759 A1 | 9/2007 | Merkel | 55/523 |
| 2007/0234694 A1 * | 10/2007 | Miyairi et al. | 55/523 |
| 2007/0241484 A1 * | 10/2007 | Morimoto | 264/630 |
| 2008/0047243 A1 | 2/2008 | Beall et al. | 55/523 |
| 2008/0092499 A1 * | 4/2008 | Otsuka et al. | 55/307 |
| 2009/0017283 A1 * | 1/2009 | Hiramatsu et al. | 428/304.4 |
| 2010/0234206 A1 | 9/2010 | Miao et al. | 501/83 |

* cited by examiner

HONEYCOMB MANUFACTURING METHOD USING GROUND NUT SHELLS AND HONEYCOMB BODY PRODUCED THEREBY

RELATED APPLICATIONS

This application claims the benefit of U.S. Provisional Application No. 61/067,614, filed Feb. 29, 2008, entitled "Honeycomb Manufacturing Method Using Ground Nut Shells and Honeycomb Body Produced Thereby."

FIELD

The present invention relates to a honeycomb body and method of manufacturing same.

BACKGROUND

Recently, much interest has been directed towards diesel engines due to their inherent fuel efficiency and durability. In order to control diesel emissions to high emissions standards, diesel engine manufacturers and emission-control companies are working on systems and components to achieve stringent emission requirements. One aspect of emission control involves controlling the levels of particulates present in the exhaust stream. For example, diesel particulates are mainly composed of carbon soot. One effective way of removing such carbon soot from diesel exhausts is through use of diesel filters, or combinations of diesel oxidation catalysts (DOCs) and diesel filters. The most widely-used diesel filter is a porous ceramic diesel particulate filter (sometimes referred to as a "wall flow filter") which filters the diesel exhaust by capturing the soot on or in its ceramic porous walls. The diesel particulate filter is designed to provide soot filtration without significantly hindering the exhaust flow, i.e., without creating significant unwanted back pressure.

Generally, such diesel particulate filters and DOCs include an arrangement of porous ceramic walls forming generally parallel cell channels arranged in a honeycomb configuration. In the case of the filter, at least some of the cell channels are plugged along their length thereby forcing at least a portion of the engine exhaust gas to pass through the filter's porous walls. Such filters may optionally further include a catalyst coating, such as an oxidation or NOx catalyst, on their surface. Various particulate filters are described in U.S. Pat. Nos. 4,329,162; 4,390,355; 4,416,676; 4,509,966; and 4,840,827, for example.

Currently, for various applications, it is desired that such honeycomb filters and DOCs are made to be relatively large; such as 13 inches in diameter, or more. Additionally, to provide low back pressure and to allow the addition of a catalyst coating, it is desirable for the filters to exhibit relatively high total porosity, such as 45% total porosity or more. Generally, to form such high porosities, a large amount of a pore former material must be used. As a result, a significant problem associated with the manufacture of such honeycomb ceramic filters and DOCs due to the large amount of pore former is cracking during drying and/or firing. Thus, it would be considered a significant advancement to obtain a relatively high porosity honeycomb body, especially a large dimension porous ceramic honeycomb body, with a reduced rate of cracking during manufacturing.

SUMMARY

According to embodiments of the invention, and in a first aspect, a method of manufacturing a honeycomb body is provided, comprising the steps of mixing inorganic material sources, a nut shell pore former, and forming aids to form a plasticized batch, wherein the nut shell pore former has a particle size distribution with 20 $\mu m \leq d_{p50} \leq 70$ $\mu m$ wherein $d_{p50}$ is a median particle diameter wherein 50% of the particle volume has a smaller particle diameter, and forming, such as by extrusion, the plasticized batch into the honeycomb body having a plurality of channels formed by intersecting walls. According to further embodiments, the nut shell pore former may exhibit a particle size distribution wherein $d_{p10} \geq 10$ $\mu m$ wherein $d_{p10}$ is a particle diameter wherein 10% of the particle volume has a smaller particle diameter.

Utilizing nut shells having been processed to control the particle size distribution as discussed above, such as providing controlled median and/or small particle fractions of the particle size distributions may include numerous advantages. In particular, it is possible that numerous processing advantages may be realized by the use of such particle size controlled nut shells. For example, when large volume percentages of the nut shell pore former are used, such as when manufacturing high porosity, porous ceramic honeycombs, drying and or firing cracking may be substantially reduced, especially when compared to comparable amounts of starch or graphite pore formers. Furthermore, the use of such nut shell pore formers may offer improvements in terms of shape retention and reduce slumping, thus resulting in a better near net shape of the extruded honeycomb body. This feature may be very desirable for the manufacture of large, heavy, honeycomb bodies where peripheral contour dimension control is a significant problem. Additionally, the use of such nut shell pore formers may improve skin quality, by reducing fissures and other skin defects. Moreover, controlling the small pore fraction of the particle size distribution of the nut shell pore former may further reduce shrinkage, as well as shrinkage variation, as compared to nut shell distributions. Additionally, the use of nut shell pore formers with the small pore fraction controlled may allow for a relatively narrow pore size distribution of the ceramic honeycomb bodies thus produced.

For more clarity, it was discovered that the use of particle size controlled nut shells, such as walnut shells, pecan shells, or the like, as a pore former may be used to manufacture relatively large honeycomb bodies (e.g., greater than 75 in² total frontal area, i.e., the closed frontal area plus the open frontal area) with very low incidences of cracking. The nut shell pore former may be included in an amount of between 5 wt. % and 80 wt. % based on 100% of the weight of the inorganic material sources, or even 20-50 wt. %, for example.

According to yet further embodiments of the invention, a honeycomb body, such as a green body (either wet or dried) is provided comprising a plurality of cell channels formed from intersecting walls, the walls formed of a mixture of inorganic source materials selected from the group of magnesia sources, titania sources, alumina sources, silica sources, or combinations, the nut shell pore former, and forming aids to form a plasticized batch, wherein the nut shell pore former has a particle size distribution with 20 $\mu m \leq d_{p50} \leq 70$ $\mu m$ wherein $d_{p50}$ is a median particle diameter wherein 50% of the particle volume has a smaller particle diameter. The forming aids may include a liquid vehicle such as water, and/or a cellulose material such as methylcellulose, for example. Additionally, the nut shell pore former may optionally or additionally include $d_{p10} \geq 10$ $\mu m$ wherein $d_{p10}$ is a particle diameter wherein 10% of the particle volume has a smaller particle diameter.

The porous ceramic honeycomb bodies produced by the use of the method of the invention include porous interconnected cell walls including a ceramic material with many pores and having a pore size distribution with $d_b \leq 1.10$, wherein $d_b = (d_{90} - d_{10})/d_{50}$. In certain embodiments, $d_b \leq 1.00$, $d_b \leq 0.90$, or $d_b \leq 0.80$ are demonstrated. As used herein, $d_{10}$ is a pore size wherein 10% of the pore volume has a smaller pore diameter, $d_{50}$ is a median pore size wherein 50% of the pore volume has a smaller pore diameter, and $d_{90}$ is a pore size wherein 90% of the pore volume has a smaller pore diameter (as measured by mercury porosimetry).

In most preferred embodiments, the total porosity (% P) of the walls of the ceramic honeycomb produced is relatively large, characterized by % P≥45%; % P≥50%, % P≥55%, or even % P≥60%. Furthermore, such ceramic honeycomb embodiments may additionally include small-sized portions of the pore size distributions of the walls having a relatively narrow pore size distribution wherein $d_f \leq 0.5$; wherein $d_f = (d_{50} - d_{10})/d_{50}$ and wherein $d_{10}$ and $d_{50}$ are as described above. In some embodiments, exceedingly narrow small-sized portions are provided wherein $d_f \leq 0.40$, $d_f \leq 35$; $d_f \leq 30$; or even $d_f \leq 0.25$.

DETAILED DESCRIPTION

Figure 1:
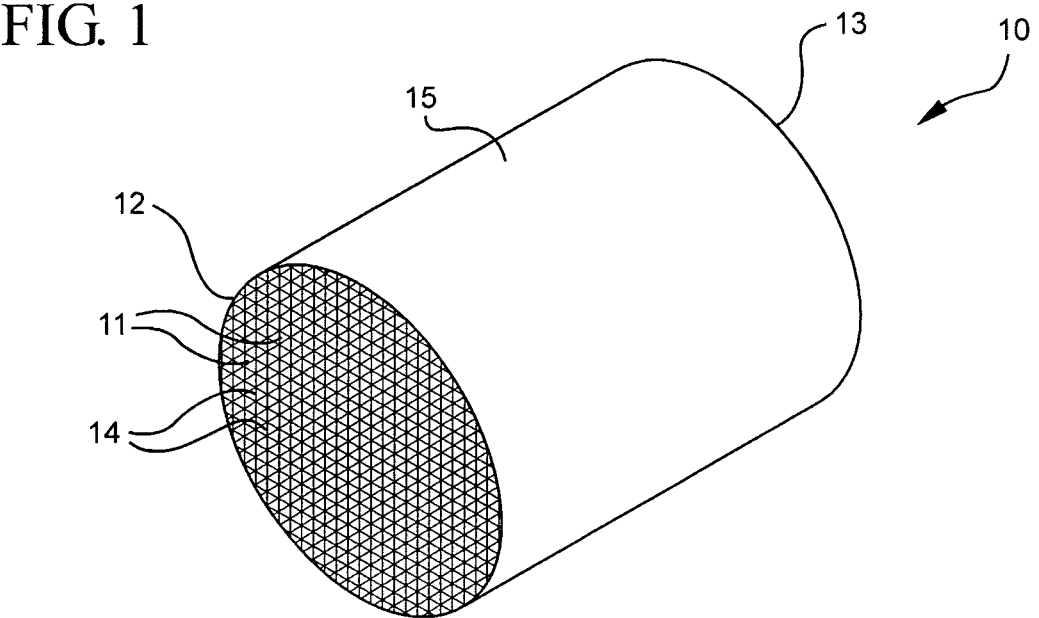
FIG. 1 illustrates a perspective view of a honeycomb body according to embodiments of the invention.

The present invention, according to a first aspect, relates to a method of manufacturing a porous ceramic honeycomb body, such as a plugged wall-flow filter or flow through substrate, which may, in one advantage, enable improved drying of such honeycombs during processing, especially when such honeycombs are relatively large. Additionally, the method may, as indicated by the exemplary embodiments, produce a porous ceramic honeycomb body that includes a relatively narrow pore size distribution; both for the small pore fraction (that $\leq d_{50}$), and also of the overall pore fraction. In a preferred implementation, the method is useful for producing porous ceramic honeycomb bodies having relatively high total porosity (% P), such as % P≥45%, % P≥50%, % P≥55%, or even % P≥60%. Particulate wall-flow filters having this range of % P are useful for filtering particulate matter, such as soot, from exhaust streams, for example. Such relatively high porosity honeycombs which exhibit walls with narrow pore size distributions are especially useful in cases where the walls include a washcoat and/or catalyst, such as in a catalyzed filter, a diesel oxidation catalyst, or a NOx or SCR catalyst.

It should also be recognized that the method utilizing controlled particle size nut shell pore formers have excellent applicability to the manufacture of porous ceramic honeycomb bodies based on oxide-based ceramic materials, such as materials having a phase selected from the group of cordierite and aluminum titanate. Examples of these materials are shown herein below. However, it should be recognized that the method has applicability for the manufacture of honeycombs having other ceramic material types, such as silicon carbide, silicon nitride, NZP, mullite, zeolite, beta spodumene, alumina, magnesium aluminum titanate, and the like.

The relative narrowness of the pore size distribution for the porous cell walls of the fired honeycomb body will now be discussed in more detail. Providing narrow pore distribution of the coarse fraction (above $d_{50}$) of the pore distribution improves initial filtration efficiency by reducing the percentage of relatively large pores. Likewise, it may also improve the strength of the honeycomb body. Controlling the small pore fraction ($\leq d_{50}$) has been found to not only improve the d-factor ($d_f$), which is beneficial in terms of lowering overall backpressure in honeycomb filter body. Thus, according to another broad aspect of the invention, the overall breadth, $d_b$, of the pore size distribution of the ceramic honeycomb body may be controlled by the use of the nut shell pore former to be relatively narrow. This may be achieved and may overcome or mitigate a propensity for cracking associated with other pore forming approaches, such as the use of starch. The pore distribution breadth, $d_b$, as used herein is a measure of the overall breadth of the pore size distribution of the porous walls of the ceramic honeycomb, i.e., the overall narrowness of the pore size distribution of the honeycomb's wall material. The overall breadth, $d_b$, is given by the following relationship:

$$d_b = (d_{90} - d_{10})/d_{50}$$

wherein
$d_{10}$ is a pore diameter wherein 10% of the pore volume has a smaller pore diameter,
$d_{50}$ is a median pore diameter wherein 50% of the pore volume has a smaller pore diameter, and
$d_{90}$ is a pore diameter wherein 90% of the pore volume has a smaller pore diameter.

In more detail, as shown and described in the Table 3 below, certain cordierite-containing embodiments are disclosed which achieve relatively narrow breadth, $d_b$. More particularly, $d_b \leq 1.50$ is achieved by numerous examples described herein. Some embodiments achieve even narrower breadth with $d_b \leq 1.00$, $d_b \leq 0.90$, or even $d_b \leq 0.80$.

In another broad aspect of the invention, even the small pore fraction of the pore size distribution (that portion of the distribution $\leq d_{50}$) of the fired honeycomb may also be controlled to be relatively narrow. As utilized herein, $d_f$ is a measure to characterize the relative narrowness of the smaller pore size portion (smaller than $d_{50}$) of the pore size distribution. Herein, $d_f$ is given by the following equation:

$$d_f = (d_{50} - d_{10})/d_{50}$$

wherein $d_{10}$ and $d_{50}$ are as described above.

Many of the cordierite phase-containing embodiments described herein exhibit $d_f \leq 35$. Such narrow pore size distribution may lower the overall pressure drop when the material is utilized to form the walls in a particulate filter (both coated and uncoated); an example filter being shown and described with reference to FIG. 2. Still further embodiments of the invention may exhibit $d_f \leq 0.30$, $d_f \leq 0.25$, or even $d_f \leq 0.22$.

In addition, while retaining at least some of the aforementioned processing advantages, the median pore diameter ($d_{50}$) of the oxide-based porous material forming the porous cell walls of the ceramic honeycomb may be controlled between 10 μm and 30 μm; between 10 μm and 25 μm, or even between 10 μm and 20 μm.

Figure 2:
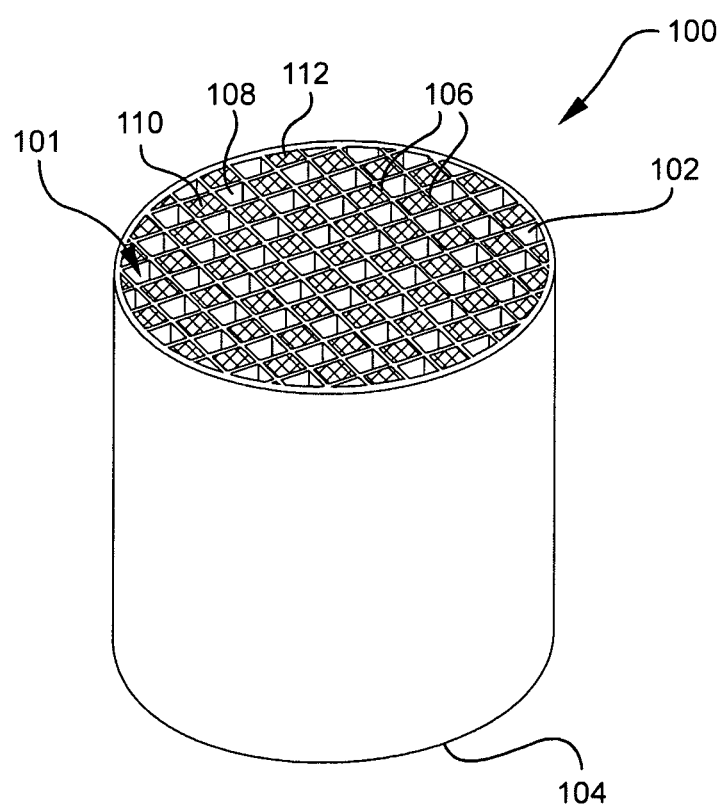
FIG. 2 illustrates a perspective view of a porous ceramic honeycomb filter according to further embodiments of the invention.

According to certain exemplary embodiments of the invention, as shown in the Tables 2 and 3, the walls of the honeycomb body of FIGS. 1 and 2 are manufactured from an oxide-based material which contains predominantly cordierite having a stoichiometry of $Mg_2Al_4Si_5O_{18}$. In other exemplary embodiments, the walls of the honeycomb body of FIGS. 1 and 2 contain a predominately aluminum titanate, as described in Tables 4 and 5.

When the oxide-based material comprises a predominantly cordierite phase, it should be understood that a limited substitution of other constituents such as Fe (iron), Co (cobalt), Ni (nickel), and Mg (manganese) for the Mg (magnesium), Ga (gallium) for the Al (aluminum), and Ge (germanium) for the Si (silicon) is acceptable. Further, the cordierite phase may contain up to three atoms of an alkali (Group IA) metal, two atoms of an alkaline earth metal (Group IIA), or one atom of a rare earth metal (scandium, yttrium, or a lanthanide metal) per 54 oxygens.

The batch composition and properties of various examples of such cordierite-containing materials are illustrated in the Tables 3 and 4 below. In particular, the pore size distributions for the cordierite ceramic honeycombs produced by the invention may include a pore structure having $d_{10} \geq 9$ µm; $d_{10} \geq 10$ µm or even $d_{10} \geq 12$ µm. Additionally, the pore structure may be controlled such that $d_{90} \leq 50$ µm; $d_{90} \leq 40$ µm, or even $d_{90} \leq 30$ µm. The median pore diameter, $d_{50}$, for these honeycombs may be $10 \mu m \leq d_{50} \leq 30 \mu m$, $10 \mu m \leq d_{50} \leq 25 \mu m$ or even $10 \mu m \leq d_{50} \leq 20 \mu m$.

As is reported in Table 3, the cordierite honeycombs of the present invention may exhibit, a mean coefficient of thermal expansion (CTE) from 25° C. to 800° C. in at least one direction, as measured by dilatometry, of $CTE \leq 25 \times 10^{-7}$/° C.; $CTE \leq 20 \times 10^{-7}$/° C., or even $CTE \leq 15 \times 10^{-7}$/° C.

Exemplary cordierite honeycombs of the present invention may exhibit, a cordierite ceramic honeycomb having the following combination of properties:
% P≥45%,
MPD≥10 µm,
$d_f \leq 0.6$ wherein $d_f = d_{50} - d_{10}/d_{50}$, and
$CTE \leq 25 \times 10^{-7}$/° C. from 25-800° C.

Even more precisely, exemplary cordierite honeycombs of the present invention may exhibit, a cordierite ceramic honeycomb having the following combination of properties:
% P≥50%,
MPD≥10 µm,
$d_f \leq 0.4$ wherein $d_f = d_{50} - d_{10}/d_{50}$, and
$CTE \leq 20 \times 10^{-7}$/° C. from 25-800° C.

According to embodiments of the invention, the honeycomb body produced by the method and as a result of firing the honeycomb green body may be configured as a porous ceramic honeycomb filter 100 as shown in FIG. 2 and include a body of porous material in the form of a honeycomb structure 101. The material may include the controlled pore structure as described herein and is formed, preferably by extrusion. The fired honeycomb includes a plurality of generally parallel cell channels (inlet cell channels 108 and outlet cell channels 110) separated by porous cell walls 106. The honeycomb green body of the invention includes this same structure, albeit the walls are unfired. In the fired honeycomb, at least some of the cell channels may include plugs 112, which may themselves be porous. According to some embodiments, a portion of the cell channels at the inlet end 102, and a portion of the cell channels at the outlet end 104 may be plugged with a paste having same or similar composition to that of the honeycomb body, for example as described in U.S. Pat. No. 4,329,162; U.S. Pat. No. 6,809,139; US 2006/0272306; WO 03/074599; or WO 2008/008332. The plugs 112 are preferably located at the ends of the cell channels 108, 110 and typically have a depth of about 5 to 20 mm, although this can vary. The plugs may be formed by the exemplary process described in U.S. Pat. No. 4,557,773. The respective plugged inlet channels 108 may be arranged adjacent to the plugged outlet channels 110 such that some wall flow through the cell walls 106 is accomplished in use. The preferred plugging arrangement is to have every other cell on a given face plugged as in a checkerboard pattern as shown in FIG. 2, although any other suitable plug pattern or arrangement may be employed. Moreover, plugging may be provided only at one end, on both ends, or only some channels may be plugged, with others being unplugged along their length.

Honeycomb bodies having plugs are known as "particulate" or "wall flow" filters, since the flow paths resulting from channel plugging require at least some of the exhaust being treated to flow through the porous ceramic cell walls prior to exiting the filter. Thus, such porous ceramic honeycomb filters are useful for filtering particulate material from an exhaust, for example, removing/filtering soot from an exhaust stream. Such filters may further include a catalyst thereon, such as a NOx or oxidation catalyst. Although filters are described extensively herein, the honeycombs produced may find utility for applications where no plugs are desired, such as in substrate applications such as for NOx, DOC, SCR, or other catalyst applications.

Further, because of the shape retention advantage that may be provided from the use of the present invention nut shell pore former, low cell density honeycombs may be manufactured while also including relatively low wall thickness. For example, honeycombs having a ratio of cell density (CD) in cpsi, divided by the wall thickness ($T_{wall}$), i.e., $CD/T_{wall}$ which is greater than 30, greater than 40, or even greater than 50, may be manufactured by the invention with low slumping (deformation of the cells under the honeycombs own weight). The honeycombs may have cell densities from about 100 cells/in$^2$ (15.5 cells/cm$^2$) to about 400 cells/in$^2$ (62 cells/cm$^2$) and wall thicknesses between about 5 µm and 30 µm, 5 µm and 20 µm. or even between 7 µm and 15 µm.

According to a further aspect, the invention is directed to a method for manufacturing a honeycomb body, the details of which are provided herein below. The method comprises the steps of mixing a batch of inorganic source materials with the nut shell pore former and forming aids to produce a plasticized batch. The nut shell pore former is formed of nut shell particles formed by grinding, cutting, mashing or any other suitable method for forming particles. The nut shell particles are preferably walnut shells, pecan shells, or the like. Walnut shells are most preferred, with English walnut shells being most preferred. However black walnut shells process acceptably also.

More particularly, the nut shell pore former is provided to exhibit or modified to exhibit a narrow particle size distribution as defined by its breadth and/or the extent of the small particle fraction thereof. "Pore former" as used herein is defined as a fugitive particulate material which evaporates or undergoes vaporization by combustion during drying and/or heating of the green honeycomb body to obtain a desired porosity, usually larger porosity and/or coarser median pore diameter than would be obtained otherwise without the pore former.

According to embodiments, the nut shell pore former is included in the batch mixture for forming a porous ceramic honeycomb body and has been provided with a controlled particle size distribution, such as by sufficiently grinding, or by sieving, sifting, classifying (such as by air classifying) or otherwise controlling the distribution such that a median pore diameter ($d_{p50}$) is provided wherein $20 \mu m \leq d_{p50} \leq 70 \mu m$, $20 \mu m \leq d_{p50} \leq 50 \mu m$, or even $25 \mu m \leq d_{p50} \leq 45 \mu m$. It has been discovered that providing this coarseness of nut shell pore former may reduce the exothermic reaction during firing and pore former burnout, in that versions of the nut shells having this range $d_{p50}$ have a slower burnout rate than finer versions, thus may minimizing cracking.

Additionally, it has been discovered that removing or limiting a portion of the fine particle fraction (that $\leq d_{p50}$) has benefits in terms of reduced shrinkage and/or shrinkage variations. In particular, in another broad aspect of the invention, the narrow particle size distribution of the nut shell pore former may be controlled such that $d_{p10} \geq 10$ μm, $d_{p10} \geq 12$ μm $d_{p10} \geq 15$ μm, or even $d_{p10} \geq 20$ μm wherein $dp_{10}$ is a particle size wherein 10% of the particle volume has a smaller particle size. Further, the pore diameter ($d_{90}$) of the nut shells may be controlled such that $d_{p90} \leq 100$ μm, or even $d_{p90} \leq 90$ μm wherein $d_{p90}$ is a particle diameter where 90% of the particle volume has a smaller particle diameter. Particle size for all particles listed herein has been measured by a laser diffraction technique, such as a Microtrac particle size analyzer.

According to additional embodiments of the invention, the nut shell pore former may include a narrow particle size distribution characterized by $d_{pf} \leq 0.54$, $d_{pf} \leq 0.50$, $d_{pf} \leq 0.40$, or even $d_{pf} \leq 0.30$ The nut shell pore former may be obtained from English walnut shells, black walnut shells, pecan shells or the like.

The pore former may constitute between 5-80 wt. %; between 10-60 wt. %, or even between 20-50 wt. % based on 100% of the inorganic raw materials, i.e., by superaddition (% SA). In particular, it should be recognized that the pore size distribution of the nut shell pore former may be manipulated to achieve the desired overall breadth as described herein. In particular, the distribution may be controlled such that particle size breadth ($d_{pb}$) is $d_{pb} \leq 1.60$, $d_{pb} \leq 1.55$, $d_{pb} \leq 150$, or even $d_{pb} \leq 1.45$.

Figure 3:
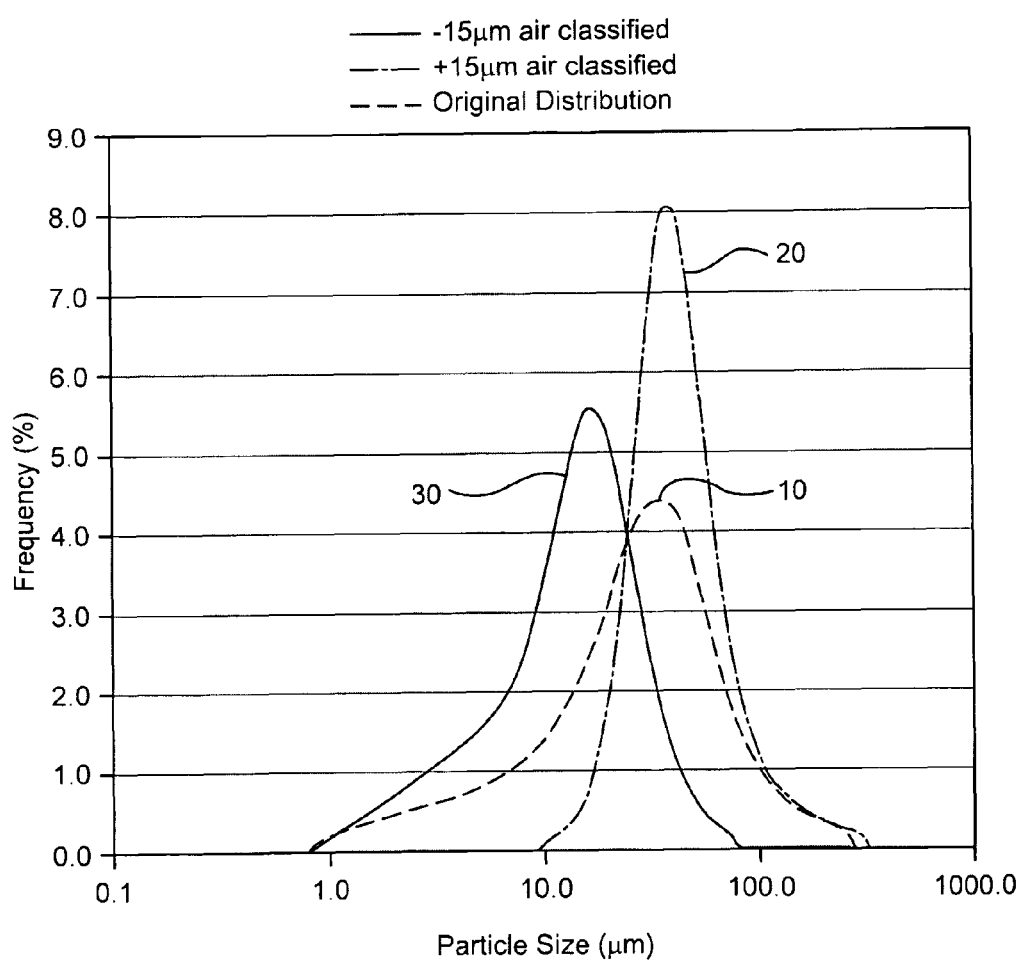
FIG. 3 illustrates several graphs of Particle Size vs. % of Distribution for various nut shell pore formers according to aspects of the invention.

One exemplary walnut shell pore former exhibits a particle size distribution as shown in 10 in FIG. 3, and includes a median particle size, $d_{p50}$, of about 27 μm, but includes a large amount of fine particles in the distribution. It was discovered that although this material may be able to be fired effectively, that the fired honeycomb will exhibit relatively large shrinkage (about 7%). This material was further processed and modified by air classification to roughly split the distribution into a coarser portion (labeled 20) and a finer portion (labeled 30). FIG. 3 illustrates, labeled as 20, the preferred particle size distribution with a portion of the fine particles removed. This controlled distribution 20 includes a mean particle size, $d_{p50}$, of about of between 30 μm and 50 μm. This controlled distribution includes a $d_{pf} \leq 0.54$. Removing the fine particle fraction 30 from the distribution 10 dramatically reduces shrinkage, as well as shrinkage variation. In particular, shrinkage was reduced from about 7% to about 4% by further controlling the fine fraction. Interestingly, the honeycombs made with the fine fraction 30 all cracked and also exhibited very high shrinkage (about 8%). Controlling the median particle diameter and the fine fraction may produce articles having low cracking rates and low shrinkage.

According to another broad aspect, the invention is a plasticized batch mixture used for forming the ceramic honeycomb body, as well as a green honeycomb body formed from the batch mixture. The batch comprises a mixture of sources of inorganic materials, the nut shell pore former as described above, and forming aids. The inorganic source materials, depending on the material system to be manufactured, include at least two selected from a group of forming sources consisting of magnesia source, alumina source, silica source, and a titania source. In the case of cordierite-forming batch mixtures, the inorganic source materials include magnesia-, alumina-, and silica-forming sources. In the case of aluminum titanate forming batch mixtures, the inorganic source materials include alumina-, silica-, and titania-forming sources.

The batch preferably also includes forming aids that may include one or more of a lubricant, a temporary binder, and a liquid vehicle. The preferred temporary binder may be methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxymethylcellulose, and mixtures thereof. Methylcellulose and/or methylcellulose derivatives may be especially suited as organic binders in the practice of the present invention with methylcellulose, hydroxypropyl methylcellulose, or combinations of these being preferred.

Water is the preferred liquid vehicle. However, the liquid vehicle may be any medium for the binder to dissolve in thus providing plasticity to the ceramic precursor batch and wetting of the powders. The solvent may be aqueous based such as, but not limited to, water or water-miscible solvents. Most useful may be aqueous based solvents which provide hydration of the binder and powder particles. Typically, the amount of aqueous liquid vehicle may be from about 20 wt. % by weight to about 70 wt. % by superaddition (% SA). The lubricant may include a fatty acid, such as tall oil or Liga. The inorganic raw materials are blended together with organic forming aids (and the liquid vehicle) to form a homogeneous plastic batch mixture.

After being mixed and mulled in a suitable mixing device, such as a Littleford mixer, batch mixture may then be plasticized and formed into a honeycomb green body, optionally dried, and then fired, for example in a furnace, to form a porous honeycomb body. The plasticizing and forming is preferably accomplished by an extrusion process by extruding the plastic batch mixture from a twin screw or ram extruder through an extrusion die, as taught in U.S. Pat. No. 6,080,348, for example. The extruded honeycomb green body 10 has a honeycomb structure as shown in FIG. 1 which generally includes a plurality of cell channels formed of intersecting walls. Other forming methods know to those of ordinary skill in the art may also be utilized. The honeycomb green body 10 formed includes the nut shell pore former with the controlled pore size distribution as described above, i.e., having a particle size distribution with 20 μm $\leq d_{p50} \leq 70$ μm wherein $d_{p50}$ is a median particle diameter. The preferred nut shell pore former is manufactured from ground walnut shells, most preferably English walnut shells, most preferably having a controlled distribution with a portion of the fine particles removed as described above.

In the formation of a cordierite material, the inorganic source materials preferably include one or more magnesia-forming sources, one or more alumina-forming sources, and one or more silica-forming sources. The raw material mixture may contains combinations of talc, alumina, and silica for example.

In a preferred embodiment, the cordierite-forming inorganic source materials include talc, alumina, boehmite, a silica source such as quartz, and may further include bentonite or atapulgite clay. Other batch additives such as strontium carbonate and/or yttrium oxide may be added. The median particle sizes of the inorganic raw materials, as described below, are measured in micrometers, and are derived from the volumetric distribution of particle sizes, as measured by a laser diffraction technique on a Microtrac apparatus as described herein.

The preferred talc, a combined magnesia-silica-forming source, has a mean particle size greater than about 9 μm, and in some embodiments greater than 15 μm, but preferably has a mean particle size less than 35 micrometers. The talc source may also include calcined talc. The talc is preferably provided in an amount of between 35 and 45 wt. % of the total inorganic materials.

Kaolin may also be used as a source material while appropriately adjusting the other inorganics to achieve the cordierite stoichiometry. If present, the weight percentage of kaolin clay should be in the range of between 12 and 20 wt. %. Weight percents of kaolin greater than this value will result in higher pressure drop for filters produced.

The silica-forming source includes, but is not limited to, quartz, cristobalite, non-crystalline silica such as fused silica or a sol-gel silica, zeolite, and diatomaceous silica, and combinations thereof. Quartz is most preferred. The average of the median particle sizes of the silica source is preferably greater than 10 μm, and is preferably between 10 μm and 35 μm.

The alumina-forming source is preferably a powder which, when heated to a sufficiently high temperature in the absence of other raw materials, yields substantially pure aluminum oxide. The alumina-forming source may be an alpha-alumina, a transition alumina such a gamma-alumina or rho-alumina, boehmite, aluminum hydroxide (aluminum trihydrate), or combinations thereof. Most preferably, the alumina-forming source comprises a combination of α-alumina ($Al_2O_3$) and boehmite. Preferably, the weighted average of the median particle sizes of the alumina-forming sources have a median particle size of less than 10 μm; or even less than 5 μm.

In addition to the nut shell pore former, embodiments of the present invention may further include a second pore-former such as graphite in the batch material mixture. Examples including combinations of walnut shells and graphite are described. This combination may be useful in lowering the coefficient of thermal expansion. Other combinations may be employed, such as combinations of nut shell pore former with starch, or nut shell pore formers with a polymer, for example.

As shown in FIG. 1, inventive examples of cordierite-forming green honeycombs 10 were prepared by weighing out the dry ingredients including various examples of the inventive pore formers listed in Table 2 and forming aids such as a cellulosic material. The dry ingredients are then mixed with a liquid vehicle, such as with water, and a lubricant, and kneaded in a preferably stainless steel muller to form an extrudable plastic mass. The plastic mass is then formed, preferably extruded, into a green body, as described in U.S. Pat. No. 5,205,991, for example, which may then be dried, such as by microwave, RF, air drying, or a combination thereof. Upon being dried, the cellular honeycomb green bodies may be cut to exact lengths.

The extruded green body 10 includes a honeycomb structure having a plurality of generally parallel cell channels 11 formed, at least partially defined by intersecting cell walls 14 (otherwise referred to as "webs") that extend from a first end 12 to a second end 13. Preferably, the green body 10 also includes an extruded smooth skin 15 formed about the honeycomb structure, although this is optional and may be formed in later processing. The wall thickness of each cell wall 14 is preferably about 0.005 to 0.03 inches (about 127 to 762 μm). In a preferred implementation, the cellular honeycomb structure consists of multiplicity of parallel cell channels 11 of generally square cross section formed into a honeycomb structure. Alternatively, other cross-sectional configurations may be used in the honeycomb structure as well, including rectangular, round, oblong, triangular, octagonal, hexagonal, or combinations thereof. The term "honeycomb structure" as used herein is defined as a connected structure of longitudinally-extending cells formed of intersecting cell walls, having a generally repeating pattern therein. The honeycomb may take the form of a segment (not shown) which are adhered together after firing by a ceramic sealing material to form a segmented honeycomb.

After drying, the honeycombs are fired in a furnace at an average heating rate of between 1 and 100° C./hour, more preferably between 20 and 70° C./hour, and most preferably between 25 and 50° C./hour, to a maximum (top) temperature of about 1380° C. to 1440° C., or even 1400° C. to 1425° C., and held at this top temperature for 1 to 30 hours, 5 to 25 hours, or even 10 to 20 hours. Following firing, at least some of the cell channels may be plugged, for example, as is described in U.S. Pat. No. 4,557,773 to Bonzo to form a particulate filter. Preferably, the plugs are provided in a checkerboard pattern on each respective end; wherein inlet channels are plugged at the second end and outlet channels are plugged at the first end. The plugged filter may then be re-fired.

Utilizing the nut shells having a fraction of the fine particles controlled allows for shrinkage of less than 6%, less than 5%, or even less than or equal to 4%, for example. Shrinkage is measured on the fired honeycomb relative to the wet extruded article. The shrinkage is defined herein as the dimensional difference between the wet and as fired dimensions then divided by the wet dimension and that result multiplied by 100 to provide a shrinkage percentage.

The controlled particle size distributions for the nut shells pore formers of embodiments used in the invention are described in Table 1 and exemplary versions are shown in the FIG. 3. In particular, the particle sizes given below are measured by a laser diffraction technique. The values reported herein are measured by a Microtrac FRA9200 Series particle size analyzer. In a preferred implementation, the nut shell pore formers may have a particle size distribution with a combination of $d_{p10} \geq 10$ μm and $20$ μm $\leq d_{p50} \leq 70$ μm wherein $d_{p10}$ is a particle diameter wherein 10% of the particle volume has a smaller particle diameter, and $d_{p50}$ is a median particle diameter wherein 50% of the particle volume has a smaller particle diameter.

TABLE 1

Nut Shell Pore Former Examples

| Version | Type of Nut Shell | $dp_{10}$ (μm) | $dp_{50}$ (μm) | $dp_{90}$ (μm) | dpf = (d50 − d10)/d50 | dpb = (d90 − d10)/d50 |
|---|---|---|---|---|---|---|
| C1 | L1 English Walnut (fine) | 2.3 | 7.0 | 15.9 | 0.671 | 1.943 |
| V1 | L1 English Walnut (−325) | 4.9 | 26.7 | 58.7 | 0.816 | 2.015 |
| V2 | L1 English Walnut (coarse) | 16.2 | 34.3 | 67.8 | 0.528 | 1.504 |
| V3 | L2 English Walnut (−325) | 4.7 | 26.8 | 70.1 | 0.825 | 2.440 |
| V4 | L2 English Walnut (coarse) | 22.7 | 38.9 | 77.0 | 0.214 | 1.390 |
| V5 | L3 English Walnut (coarse) | 22.7 | 38.9 | 77.0 | 0.214 | 1.390 |
| V6 | L4 English Walnut (coarse) | 12.4 | 37.6 | 87.8 | 0.670 | 2.005 |

TABLE 1-continued

Nut Shell Pore Former Examples

| Version | Type of Nut Shell | $dp_{10}$ (μm) | $dp_{50}$ (μm) | $dp_{90}$ (μm) | dpf = (d50 − d10)/d50 | dpb = (d90 − d10)/d50 |
|---|---|---|---|---|---|---|
| V7 | Black Walnut | 7.2 | 37.0 | 73.3 | 0.805 | 1.778 |
| V8 | Pecan Shell | 7.7 | 30.7 | 71.6 | 0.749 | 2.081 |

TABLE 2

Example Cordierite Batch Compositions

| | | | | Example No. | | | | | |
|---|---|---|---|---|---|---|---|---|---|
| | C1 | I1 | I2 | I3 | I4 | I5 | I6 | I7 | I8 |
| Nut Shell Type | C1 | V1 | V2 | V2 | V2 | V7 | V8 | V1 | V1 |
| Nut Shell (wt. %) | 40 | 40 | 40 | 40 | 40 | 40 | 30 | 10 | 25 |
| Max. Firing Temp (° C.) | 1400 | 1400 | 1415 | 1415 | 1415 | 1400 | 1418 | 1409 | 1418 |
| Soak Time (hrs) | 11 | 11 | 30 | 30 | 30 | 11 | 30 | 11 | 30 |
| Inorganic Materials | | | | | | | | | |
| Talc | 42.38 | 42.38 | 42.38 | 42.38 | 42.38 | 42.38 | 42.38 | 42.38 | 42.38 |
| Median Particle Sizes of Talc Source (μm) | 24 | 24 | 24 | 9.7 | 9.7 | 24 | 9.7 | 24 | 9.7 |
| Alumina | 30.12 | 30.12 | 30.12 | 30.12 | 30.12 | 30.12 | 30.12 | 30.12 | 30.12 |
| Median Particle Size of Alumina-Forming Source (μm) | 3.4 | 3.4 | 3.4 | 1.8 | 1.8 | 3.4 | 1.8 | 12 | 3.4 |
| Boehmite | 5.0 | 5.0 | 5.0 | 5.0 | 5.0 | 5.0 | 5.0 | 5.0 | — |
| Median Particle Size of Boehmite Source (μm) | 0.08 | 0.08 | 0.08 | 0.08 | 0.08 | 0.08 | 0.08 | 0.08 | |
| Silica Source (Quartz) | 23.5 | 23.5 | 23.5 | 23.5 | 23.5 | 23.5 | 23.5 | 23.5 | 23.5 |
| Average Median Particle Size of Silica Sources (μm) | 3.7 | 3.7 | 3.7 | 3.7 | 3.7 | 3.7 | 3.7 | 3.7 | 3.7 |
| Bentonite Clay | 2.50 | 2.50 | 2.50 | — | — | 2.50 | — | — | — |
| Strontium Carbonate | 1.50 | 1.50 | 1.50 | — | — | 1.50 | — | — | — |
| Atapulgite Clay | — | — | — | 5.0 | 5.0 | — | 5.0 | 5.0 | — |
| Yttrium Oxide | — | — | — | 1.00 | 1.00 | — | — | — | — |
| Organic Materials | | | | | | | | | |
| Binder (Methyl Cellulose) % SA | 6.0 | 6.0 | 6.0 | 6.0 | 6.0 | 6.0 | 6.0 | 6.0 | 6.0 |
| Lubricant % SA | 1.0 | 1.0 | 1.0 | 1.0 | 1.0 | 1.0 | 1.0 | 1.0 | 1.0 |
| Liquid Vehicle (Water) % SA | 67.0 | 63.0 | 55.0 | 68.0 | 64.0 | 54.0 | 55.0 | 34.0 | 34.0 |

TABLE 3

Cordierite Honeycomb Example Properties

| | | | | Example No. | | | | | |
|---|---|---|---|---|---|---|---|---|---|
| | C1 | I1 | I2 | I3 | I4 | I5 | I6 | I7 | I8 |
| Pore Former Type | C1 | V1 | V2 | V3 | V3 | V7 | V8 | V1 | V1 |
| | | | | Fired Properties | | | | | |
| CTE ($10^{-7}$/° C.) 25-800° C. | 22.3 | 19.1 | 19.2 | 15.8 | 14.9 | 16.9 | 14.0 | 8.5 | 4.1 |
| Predominant Phase | Cordierite | Cordierite | Cordierite | Cordierite | Cordierite | Cordierite | Cordierite | Cordierite | Cordierite |
| Cell Density (cells/in$^2$) | 275 | 275 | 275 | 275 | 275 | 275 | 275 | 200 | 300 |
| Wall Thickness (inches) | 0.008 | 0.008 | 0.008 | 0.008 | 0.008 | 0.008 | 0.008 | 0.012 | 0.014 |
| MOR bar (psi) | 1276 | 824 | 746 | 896 | 660 | 1292 | 732 | 594 | 340 |
| Porosity (%) | 51 | 59.1 | 58 | 55 | 61 | 57 | 59 | 50 | 54.9 |
| $d_{10}$ (μm) | 10.12 | 12.2 | 14.14 | 13.36 | 10.24 | 13.72 | 9.26 | 9.9 | 19.2 |
| $d_{50}$ (μm) | 13.03 | 16.5 | 17.64 | 20.30 | 14.39 | 18.42 | 13.61 | 17.6 | 30.8 |
| $d_{90}$ (μm) | 29.01 | 31.6 | 28.97 | 41.96 | 22.01 | 30.04 | 22.05 | 34.8 | 56.2 |

TABLE 3-continued

Cordierite Honeycomb Example Properties

| | Example No. | | | | | | | | |
|---|---|---|---|---|---|---|---|---|---|
| | C1 | I1 | I2 | I3 | I4 | I5 | I6 | I7 | I8 |
| $d_f = (d_{50} - d_{10})/d_{50}$ | 0.22 | 0.26 | 0.20 | 0.22 | 0.29 | 0.26 | 0.32 | 0.44 | 0.38 |
| $d_b = (d_{90} - d_{10})/d_{50}$ | 1.45 | 1.18 | 0.84 | 1.41 | 0.82 | 0.89 | 0.94 | 1.42 | 1.20 |
| Shrinkage (%) | 8.0 | 7.0 | 4.0 | 7.0 | 4.0 | — | — | — | — |
| Cracking | High | Low | Low | Low | Low | Low | Low | Low | Low |

TABLE 4

Aluminum Titanate Batch Composition Examples

| | Example No. | | |
|---|---|---|---|
| | I9 | I10 | I11 |
| English Walnut Shells (% SA) | 8% | 8% | 15% |
| Type | V5 | V6 | V5 |
| Graphite (% SA) | 10% | 10% | — |
| Inorganic Raw Materials | | | |
| Titania (Ti-Pure) (%) | 29.95 | 29.95 | 29.95 |
| Al$_2$O$_3$ (Alcoa A10 - 325) (%) | 46.57 | 46.57 | 46.57 |
| Al(OH)$_3$ AC 714 (%) | 3.71 | 3.71 | 3.71 |
| Silica (%) | 10.19 | 10.19 | 10.19 |
| SrCO$_3$ (%) | 8.00 | 8.00 | 8.00 |
| CaCO$_3$ (%) | 1.38 | 1.38 | 1.38 |
| La$_2$O$_3$ (%) | 0.20 | 0.20 | 0.20 |
| Organic Materials | | | |
| Methylcellulose Binder (% SA) | 4.5 | 4.5 | 4.5 |
| Water (% SA) | 16.0 | 16.0 | 16.0 |
| Tall Oil (% SA) | 1.0 | 1.0 | 1.0 |
| Soak Temp (° C.) | 1425 | 1425 | 1425 |
| Soak Time (hours) | 16 | 16 | 16 |

TABLE 5

Aluminum Titanate Example - Properties

| | Example No. | | |
|---|---|---|---|
| (Fired Properties) | I8 | I9 | I10 |
| CTE (10$^{-7}$/° C.) 25-1000° C. | 7.6 | 8.7 | 9.4 |
| CTE (10$^{-7}$/° C.) 25-800° C. | 3.7 | 4.4 | 5.4 |
| Predominant Phase | Aluminum Titanate | Aluminum Titanate | Aluminum Titanate |
| Cell Density (cells/in$^2$) | 300 | 300 | 300 |
| Wall Thickness (inches) | 0.013 | 0.013 | 0.013 |
| Total Porosity (%) | 50.3 | 50.7 | 52.2 |
| $d_{10}$ (μm) | 8.18 | 9.57 | 8.93 |
| $d_{50}$ (μm) | 13.48 | 13.75 | 14.59 |
| $d_{90}$ (μm) | 20.10 | 20.02 | 23.99 |
| $d_f = (d_{50} - d_{10})/d_{50}$ | 0.39 | 0.30 | 0.39 |
| $d_b = (d_{90} - d_{10})/d_{50}$ | 0.88 | 0.76 | 1.03 |

Tables 4 and 5 above illustrate several examples of the present invention wherein the oxide-based material forming the porous walls of the porous ceramic honeycomb body comprises a predominant aluminum titanate phase. As in the previous cordierite honeycomb examples, overall narrow pore size distribution may be achieved by utilizing nut shells as the pore former, as well as low shrinkage and low incidences of cracking.

Additionally, the total porosity of the aluminum titanate honeycombs may be controlled by controlling the amount of nut shell pore former between 5 wt. % and 60 wt. % by superaddition (% SA); but for many applications between 10% SA and 30% SA. In more detail, these example honeycomb bodies include an aluminum titanate phase and a narrow overall distribution characterized by $d_b \leq 1.1$, $d_b \leq 1.0$, $d_b \leq 0.9$, or even $d_b \leq 0.8$. Further, narrowness of the small pore fraction may also be achieved, as indicated by $d_f \leq 0.5$, $d_f \leq 0.40$, $d_f \leq 0.35$, or even $d_f \leq 0.30$.

Additionally, the honeycomb body containing an aluminum titanate phase may be produced having total porosity, % P, wherein % P≥45%, or even % P≥50%. Further, the honeycomb body incorporating a predominant aluminum titanate phase may include a controlled coarse fraction so that $d_{90} \leq 30$ μm, or even $d_{90} \leq 25$ μm. Additionally, $d_{50}$ may be controlled between 10 and 20 μm for these exemplary honeycombs containing an aluminum titanate phase, or even between 12 and 17 μm. Demonstrated CTE for the honeycomb body containing the aluminum titanate phase in at least one direction may be CTE≤15×10$^{-7}$/° C.; or even CTE≤10×10$^{-7}$/° C., all as measured between 25° C. and 1000° C. Certain Aluminum titanate embodiments further demonstrate that CTE≤6×10$^{-7}$/° C.; CTE≤5×10$^{-7}$/° C.; or even CTE≤4×10$^{-7}$/° C., all as measured between 25° C. and 800° C. are achievable. Honeycomb bodies having aluminum titanate ceramic composition and having the following combinations of properties may be produced by the method and green body:

% P≥45%,
MPD≥10 μm,
$d_f \leq 0.6$ wherein $d_f = d_{50} - d_{10}/d_{50}$, and
CTE≤15×10$^{-7}$/° C. from 25-1000° C.

More particularly, honeycomb bodies having aluminum titanate ceramic composition and having the following combinations of properties may also be produced by the method and green body:

% P≥45%,
MPD≥10 μm,
$d_f \leq 0.4$ wherein $d_f = d_{50} - d_{10}/d_{50}$, and
CTE≤10×10$^{-7}$/° C. from 25-1000° C.

It should be understood that while the present invention has been described in detail with respect to certain illustrative and specific embodiments thereof, it should not be considered limited to such and may be used in other ways without departing from the scope of the invention as defined in the appended claims.

What is claimed is:

1. A method of manufacturing a honeycomb body, comprising the steps of:
mixing inorganic source materials, a pore former, and forming aids to form a plasticized batch, wherein the pore former includes nut shells having a particle size distribution with 30 μm≤$d_{p50}$≤50 μm wherein $d_{p50}$ is a median particle size diameter wherein 50% of the particle volume has a smaller particle diameter, wherein the nut shells exhibit a particle size distribution with $d_{p10}$≥10 μm wherein $d_{p10}$ is a particle diameter where 10% of the particle volume has a smaller particle diameter, and wherein the nut shells exhibit a value of $d_{pf} \leq 0.54$ wherein $d_{pf} = d_{p50} - d_{p10}/d_{p50}$, and forming the plasticized batch into the honeycomb body having a plurality of channels formed by intersecting walls.

2. The method of manufacturing of claim 1 wherein the pore former comprises walnut shells.

3. The method of manufacturing of claim 2 wherein the pore former comprises English walnut shells.

4. The method of manufacturing of claim 1 wherein the pore former is selected from the group consisting of pecan shells, black walnut shells, and English walnut shells.

5. The method of manufacturing of claim 1 wherein the nut shells exhibit a particle size distribution wherein $d_{p10} \geq 15$ μm.

6. The method of manufacturing of claim 1 wherein the nut shells exhibit a particle size distribution with $d_{p90} \leq 100$ μm wherein $d_{p90}$ is a particle diameter where 90% of the particle volume has a smaller particle diameter.

7. The method of manufacturing of claim 6 further comprising $d_{p90} \leq 90$ μm.

8. The method of claim 1 wherein the nut shells have a median particle size between 35 μm and 45 μm.

9. The method of claim 1 wherein the nut shells are provided in the plasticized batch in an amount between 5-80 wt. % of the inorganic source materials by superaddition.

10. The method of claim 1 wherein the pore former comprises the nut shells in combination with a second pore former.

11. The method of claim 10 wherein the second pore former is a graphite pore former.

12. The method of claim 1 further comprising a step of firing the honeycomb body to produce a cordierite ceramic honeycomb having:
% P 45%,
$d_{50} \geq 10$ μm,
$d_f \leq 0.6$ wherein $d_f = d_{50} - d_{10}/d_{50}$, and
CTE$\leq 25 \times 10^{-7}$/° C. from 25-800° C.

13. The method of claim 1 further comprising a step of firing the honeycomb body to produce an aluminum titanate ceramic honeycomb having:
% P$\geq$45%,
$d_{50} \geq 10$ μm,
$d_f \leq 0.6$ wherein $d_f = d_{50} - d_{10}/d_{50}$, and
CTE$\leq 15 \times 10^{-7}$/° C. from 25-1000° C.

14. The method of claim 1 further comprising a step of firing the honeycomb body to produce a ceramic honeycomb having 10 μm$\leq d_{50} \leq$30 μm.

15. The method of claim 1 further comprising a step of firing the honeycomb body to produce a ceramic honeycomb having $d_f \leq 0.5$ wherein $d_f = d_{50} - d_{10}/d_{50}$.

16. The method of claim 1 further comprising a step of firing the ceramic honeycomb body to produce a ceramic honeycomb having $d_f \leq 0.4$ wherein $d_f = d_{50} - d_{10}/d_{50}$.

* * * * *